US012119601B2

(12) United States Patent
Douglas et al.

(10) Patent No.: US 12,119,601 B2
(45) Date of Patent: Oct. 15, 2024

(54) WIRE CONNECTION BOOT ASSEMBLY

(71) Applicant: FASTFORWARDUSA LLC, Bonita Springs, FL (US)

(72) Inventors: Joel Douglas, Bonita Springs, FL (US); Shem Lachhman, Ponce, PR (US)

( * ) Notice: Subject to any disclaimer, the term of this patent is extended or adjusted under 35 U.S.C. 154(b) by 207 days.

(21) Appl. No.: 17/843,389

(22) Filed: Jun. 17, 2022

(65) Prior Publication Data

US 2023/0058510 A1 Feb. 23, 2023

Related U.S. Application Data

(63) Continuation-in-part of application No. 17/665,545, filed on Feb. 6, 2022, now Pat. No. 11,394,133, which is a continuation-in-part of application No. 17/585,063, filed on Jan. 26, 2022, now Pat. No. 11,387,579.

(60) Provisional application No. 63/254,289, filed on Oct. 11, 2021, provisional application No. 63/234,520, filed on Aug. 18, 2021.

(51) Int. Cl.

| | |
|---|---|
| ***H01R 4/12*** | (2006.01) |
| ***H01R 4/22*** | (2006.01) |
| ***H01R 43/033*** | (2006.01) |

(52) U.S. Cl.

CPC ................. *H01R 4/22* (2013.01); *H01R 4/12* (2013.01)

(58) Field of Classification Search

CPC ........ H01R 13/5804; H01R 4/12; H01R 4/22; H01R 4/00; H01R 4/10; H01R 43/033; H01R 43/00

USPC ....... 174/87; 439/661; 228/145; 29/876, 456

See application file for complete search history.

(56) References Cited

U.S. PATENT DOCUMENTS

| | | | | |
|---|---|---|---|---|
| 1,739,755 A * | 12/1929 | Foulder | B67B 5/06 215/275 |
| 2,823,250 A * | 2/1958 | O'Keefe | H01R 4/22 439/877 |
| 3,742,559 A * | 7/1973 | Punako | F16G 11/048 24/307 |
| 5,132,494 A * | 7/1992 | Burton | H01R 4/22 29/869 |
| 6,784,370 B1 | 8/2004 | Keswani | |
| 7,866,351 B2 | 1/2011 | Hamann | |
| 2005/0213897 A1* | 9/2005 | Palmer | G02B 6/3833 385/95 |

(Continued)

FOREIGN PATENT DOCUMENTS

| | | | |
|---|---|---|---|
| CN | 202937994 U * | 5/2013 | B32B 5/18 |
| CN | 113507020 A * | 10/2021 | H01R 13/52 |

(Continued)

OTHER PUBLICATIONS

3M Wire Connector B-G_3M_pp. 1-3_2017.*

*Primary Examiner* — Timothy J Thompson
*Assistant Examiner* — Guillermo J Egoavil
(74) *Attorney, Agent, or Firm* — Joel Douglas; Thomas Ciesco

(57) ABSTRACT

The invention relates to a method of connecting electrical wires, conductors, or connections together by rotating the connector ends in an enclosure to tightly twist the wire ends together and also includes a clamping mechanism to prevent the wires from untwisting, becoming loose, or falling out of the enclosure. The present invention increases the holding ability of current rotating tools for electrical wires and connections.

5 Claims, 18 Drawing Sheets

(56) References Cited

U.S. PATENT DOCUMENTS

| | | | | |
|---|---|---|---|---|
| 2007/0045275 | A1* | 3/2007 | Steinhauser ............ | F16L 53/38<br>219/228 |
| 2020/0156566 | A1* | 5/2020 | Shimizu ............. | H01R 13/6592 |
| 2020/0217553 | A1* | 7/2020 | Quinn ..................... | F16L 23/08 |

FOREIGN PATENT DOCUMENTS

| | | | | | |
|---|---|---|---|---|---|
| GB | 2258127 | A | * | 1/1993 | ........... A01K 63/065 |
| KR | 102130823 | B1 | * | 7/2020 | ............... H01R 4/12 |
| WO | WO-2019008055 | A1 | * | 1/2019 | ........... H01R 13/533 |

* cited by examiner

WIRE CONNECTION BOOT ASSEMBLY

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention, and the applicants, make no claim to any trademarks referenced.

This application claims the benefit of U.S. patent application Ser. No. 17/665,545 filed on Feb. 6, 2022, U.S. Provisional Patent Application No. 63/234,520 filed on Aug. 18, 2021 and U.S. Provisional Patent Application No. 63/254,289 filed on Oct. 10, 2021, which are incorporated by reference herein in their entirety.

BACKGROUND OF THE INVENTION

1) Field of the Invention

The invention relates to an apparatus for reinforcing wire and cable connections.

2) Description of Related Art

In construction, manufacturing facilities, and several other industries devices and methods of connecting electrical wires and connectors are directly connected with safety and liability. Rotate and twist wire connectors are used throughout many industries that require the installation of simple or complex wiring in a facility. The twist on connectors typically contain an insulating enclosure typically made from plastics. The enclosure is designed to be gripped easily and to make connections between two wires as seamless and quick as possible. The interior of the enclosure is fitted with a spring or metal piece which helps to tightly join the connections together inside of the enclosure. Enclosures are normally designed to be conical in shape with an open end that tapers down to a closed end. Another example of the prior art are crimp connectors which require the user to apply pressure to a metal crimp that crushes the wires and thus hold the wires in place.

The prior art also contains tools for twisting and cutting wires. Some of the tools in the prior art are primarily used to install wire nuts or connectors that serve to insulate, connect, and hold wires together.

The main issue seen in the prior art is that the wires can sometimes become loose from improper installation, vibration, or movement and fall out of the enclosure. If a user does not rotate a wire nut or connector for instance with adequate amount of turns then the wires may not be joined tightly enough. This can cause the wires to become loose or fall out of the wire nut or connector when subjected to stress. This exposes the wires to other electrical connections which increase safety and fire hazard concerns. As a result, several jurisdictions have banned twist on wire nuts or connectors from being used in residential and commercial facilities for concerns of safety and exposure of conductive connections. Another issue with the prior art and current available electrical connectors for joining wires is the use of crimp designs, if the crimp is not applied with enough pressure, the wires may also fall out. This also exposes wires which pose a safety and liability concern for installers. Additionally, tools designed to install wire nuts burden users with an additional and unnecessary cost, and also if used improperly can cause the wires to fall out of the insulating enclosure and thereby increase safety concerns.

Therefore, what is needed in the art is a better device or apparatus that can be used to prevent the wires from falling out of the insulating enclosure or electrical connectors such as wire nuts, connector or crimp, without increasing the time needed to join electrical wires to form a connection.

BRIEF SUMMARY OF THE INVENTION

The instant invention in one form is directed to an apparatus that prevents electrical wiring or connections in general from falling out of or becoming loose in connectors such as wire nuts, crimp connectors and other forms of cable or wiring connections which increases the reliability of the connector and also increases the safety of the connector. Typical connectors include wire to wire connectors such as wire nut, twist connectors, connector, crimp connectors, metal casing, ceramic connectors, screw connectors.

This means there is a need for a technological solution providing a tool that improves the functionality and reliability of cable or wiring connectors. The present invention is directed toward solutions to address this need, in addition to having other desirable characteristics. Specifically, there is a need for an easily manufactured and usable solution that not only joins two or more wires or cables together with minimal physical effort but also prevents the wires from becoming loose or split apart from the fastening mechanism thereby maximizing the reliability and safety of the connector.

An advantage of the present invention is that it prevents wiring or cabling from coming loose or being pulled apart by providing the user with an easy to use clamping mechanism which improves the safety and reliability of the connector to join two or more wires together. The instant invention is used in conjunction with the existing connectors to improve the reliability of a connection.

Another advantage of the present solution is a cinching adapter for securing at least one wire to at least one connector and the at least one connector having an inner surface and an outer surface. At least one wire is in communication with the inner surface of the at least one connector and the cinching adapter is removably attached to the outer surface of the at least one connector and the cinching connector is removable attached to the at least one wire with a flexible cinching device.

Another advantage of the instant invention is a wiring connector comprising of a cinching adapter for securing at least one wire to at least one connector and the at least one connector having an inner surface and an outer surface. The at least one wire is in communication with the inner surface of the at least one connector and the cinching adapter is removably attached to the cinching connector is removable attached to the at least one wire with a flexible cinching device.

Another advantage of the instant invention is the ability to provide strain relief for fiber-optic connections.

Another advantage of the instant solution is a cinching adapter for securing at least one wire to at least one connector and the at least one connector having an inner surface and an outer surface. At least one wire is in communication with the inner surface of the at least one connector and the cinching adapter is removably attached to the outer surface of the at least one connector such that the cinching adapter forms a cover over at least a portion to the at least one connector outer surface and covers the at least one wire proximal to the at least one connector and the cinching connector is removable attached to the at least one wire with a flexible cinching device such that the cinching adapter forms a cover over at least a portion of at least one connector and covers at least one wire proximal to the at least one connector.

Another advantage it that the parts can be assembly into a kit. This makes the installation simple and easy for the user because the parts necessary to connect the wires together using the instant invention are in one simple to use package.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
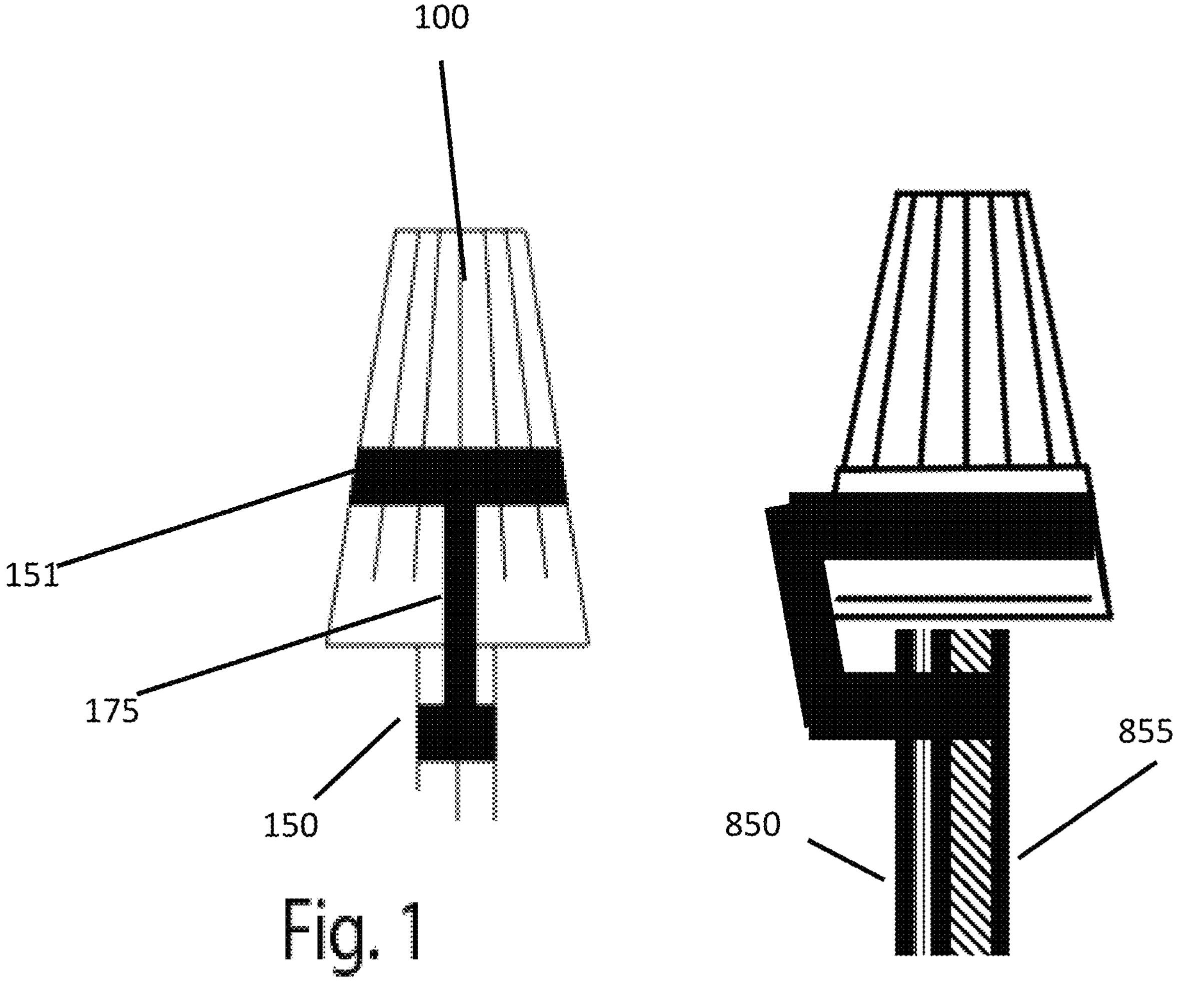
FIG. 1 is schematic of the instant invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art however that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token however, no single feature or features of any described embodiment should be considered essential to every embodiment of the invention, as other embodiments of the invention may omit such features.

In this application the use of the singular includes the plural unless specifically stated otherwise and use of the terms “and” and “or” is equivalent to “and/or,” also referred to as “non-exclusive or” unless otherwise indicated. Moreover, the use of the term “including,” as well as other forms, such as “includes” and “included,” should be considered non-exclusive. Also, terms such as “element” or “component” encompass both elements and components including one unit and elements and components that include more than one unit, unless specifically stated otherwise.

Lastly, the terms “or” and “and/or” as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

The terms wirenut, wire nut, nut, connector, crimp connectors, metal casing, ceramic connectors and screw connectors are used interchangeably to mean a device used to connect two or more wires.

The terms electrical connector, crimp connector, headphone jack, headphone plug, audio plug, socket plug, wall plug, power plug, wall socket, cable plug are used interchangeably to mean a device used to connect a plug into a receptable.

The term clip, clipping device or cinching device are used interchangeably to mean a device capable of tying at least one wire to a connector, holding fixture, bracket or polymer hood. The clipping device can be selected from but not limited to the group consisting of zip tie, wire tie, tie wrap, heat shrink material, snap clip, circle clip, e-clips, pull cord tie, clamp or crimp connector.

The term boot in the title refers to the restraining device formed from a flexible sheet including the removable first clipping device, the removable second clipping device and the hood. Where other features of the restraining device may be additionally included such as the reinforcement ring or other features described herein, the boot may also include these features.

The current solutions available to contractors are not reliable as they commonly allow cabling or wiring to fall out of the connector cavity. This can result in an unsafe condition such as fire and or other safety hazards. Therefore, there is a need for a low cost easy to use device that can be used in conjunction with the existing connectors to improve the reliability of a connection.

The instant invention is based on the knowledge that the current solutions do not provide a low cost, reliable tool or apparatus for joining two or more wires together for long periods of time and keeping them joined even under high stress environments. If a live wire becomes dislodge from a connector it poses a safety or fire hazard. The problem is further accentuated when a wire composed of numerous strands which is defined as a stranded wire is connected to a solid core wire such as 12 or 14 gauge Romex wires found in home wiring.

The instant invention can be configured in several ways to reliably join together and prevent two or more wires from un-joining or falling out of a connector's housing. The electrical connector can be any connector designed to connect two or more wires together such as but not limited to wire nut, nut, connector, crimp connectors, metal casing, ceramic connectors or screw connectors. In one embodiment the invention includes an insulating housing constructed from non-conductive material such as plastics or ceramics, a holding fixture and a clipping mechanism. The housing is formed such that it has an inner surface and external surface and the inner surface forms a cavity configured to grip at least one wire inserted into the cavity and the cavity has an opening on the proximal end to receive at least one wire or cable and is enclosed on the distal end to prevent the at least one wire or cable from passing the full length of the housing and exposing the at least one wire or cable. The at least one wire or cable can be insulated or stripped. The external surface of the housing can be shaped in a conical, tapered, rectangular, or square shape. The housing inner surface cavity that can be fitted with metal, rubber, or plastic connector pieces or the inner cavity can have a holding mechanism molded into the cavity to hold the at least one wire or cable. The connector pieces can include threaded plastic, threaded metal, crimp connectors, metal casing, ceramic connectors and any future conductive or non-conductive wiring or cabling connector or holder that joins two or more wires or cables together. The holding fixture is configured to attach over the distal end of the housing and projects in the proximal direction such that it extends pass the proximal end of the housing. The attachment method for the holding fixture can be a ring, split ring or hook integrated into the holding fixture. The clipping mechanism is configured to fix over the at least one wire or cable and the holding fixture. The clip is enabled to attach to the at least one wire to the holding fixture thereby holding the at least one wire firmly to the housing such that it cannot be unintentionally removed from the cavity of the housing.

In another embodiment the invention includes an insulating housing constructed from non-conductive material such as plastics or ceramics, a holding fixture, a first clipping mechanism and a second clipping mechanism. The housing is formed such that it has an inner surface and external surface and the inner surface forms a cavity configured to grip at least one wire inserted into the cavity and the cavity has an opening on the proximal end to receive at least one wire or cable and is enclosed on the distal end to prevent the at least one wire or cable from passing the full length of the housing and exposing at least one wire or cable. The at least one wire or cable can be insulated or stripped. The external surface of the housing can be shaped in a conical, tapered, rectangular, or square shape. The housing inner surface cavity that can be fitted with metal, rubber, or plastic connector pieces or the inner cavity can have a holding mechanism molded into the cavity to hold the at least one wire or cable. The connector pieces can include threaded plastic, threaded metal, crimp connectors, metal casing, ceramic connectors and any future conductive or non-conductive wiring or cabling connector or holder that joins two or more wires or cables together. The holding fixture is configured to be attached to the distal end of the housing using the first clipping mechanism and the holding fixture projects in the proximal direction such that it extends pass the proximal end of the housing when attached to the housing with the first clipping mechanism. The second clipping mechanism is configured to fix over the at least one wire or cable and the proximal end of the holding fixture. The second clipping mechanism is enabled to attach to the at least one wire to the holding fixture and the first clipping mechanism is enabled to hold the holding fixture to the housing thereby holding the at least one wire firmly to the housing such that it cannot be unintentionally removed from the cavity of the housing.

In another embodiment the invention includes an insulating housing constructed from non-conductive material such as plastics or ceramics, an insulating member, a first clipping mechanism and a second clipping mechanism. The housing is formed such that it has an inner surface and external surface and the inner surface forms a cavity configured to grip at least one wire inserted into the cavity and the cavity has an opening on the proximal end to receive at least one wire or cable and is enclosed on the distal end to prevent the at least one wire or cable from passing the full length of the housing and exposing the at least one wire or cable. The at least one wire or cable can be insulated or stripped. The external surface of the housing can be shaped in a conical, tapered, rectangular, or square shape. The housing inner surface cavity that can be fitted with metal, rubber, or plastic connector pieces or the inner cavity can have a holding mechanism molded into the cavity to hold the at least one wire or cable. The connector pieces can include threaded plastic, threaded metal, crimp connectors, metal casing, ceramic connectors and any future conductive or non-conductive wiring or cabling connector or holder that joins two or more wires or cables together. The insulating member can be formed from a thin sheet of vinyl, nylon, polypropylene, nylon, or other plastic which is sufficiently nonconductive. The preferred embodiment of the insulating member is that it has a hole which is configured to allow the distal end of the housing to protrude through the insulating member however the insulating member can alternatively be configured without the hole. The hole can also be reinforced to provide resistance to tearing or stretching of the insulating member. The insulating member is configured to be attached over the distal end of the housing using the first clipping mechanism and the insulating member projects in the proximal direction such that it extends pass the proximal end of the housing when attached to the housing with the first clipping mechanism. The second clipping mechanism is configured to fix over the at least one wire or cable and the proximal end of the insulating member. The second clipping mechanism is enabled to attach to the at least one wire to the insulating member and thereby holding the at least one wire firmly to the housing such that it cannot be unintentionally removed from the cavity of the housing.

In another embodiment the invention includes an insulating housing constructed from non-conductive material such as plastics or ceramics, an insulating member and a clipping mechanism. The housing is formed such that it has an inner surface and external surface and the inner surface forms a cavity configured to grip at least one wire inserted into the cavity and the cavity has an opening on the proximal end to receive at least one wire or cable and is enclosed on the distal end to prevent the at least one wire or cable from passing the full length of the housing and exposing the at least one wire or cable. At least one wire or cable can be insulated or stripped. The external surface of the housing can be shaped in a conical, tapered, rectangular, or square shape. The housing inner surface cavity that can be fitted with metal, rubber, or plastic connector pieces or the inner cavity can have a holding mechanism molded into the cavity to hold the at least one wire or cable. The connector pieces can include threaded plastic, threaded metal, crimp connectors, metal casing, ceramic connectors and any future conductive or non-conductive wiring or cabling connector or holder that joins two or more wires or cables together. The insulating member can be formed from a thin sheet of vinyl, nylon, polypropylene, nylon, or other plastic which is sufficiently nonconductive. The preferred embodiment of the insulating member is that it has a hole which is configured to allow the distal end of the housing to protrude through the insulating member. The hole has a reinforcing ring to provide resistance to tearing or stretching of the insulating member. The insulating member hole is configured to be attached over the distal end of the housing and the insulating member projects in the proximal direction such that it extends pass the proximal end of the housing when attached to the housing over the housing. The clipping mechanism is configured to fix over the at least one wire or cable and the proximal end of the insulating member. The clipping mechanism is enabled to attach to the at least one wire to the insulating member and thereby holding the at least one wire firmly to the housing such that it cannot be unintentionally removed from the cavity of the housing.

The instant invention in another embodiment includes an insulating housing constructed from non-conductive material such as plastics or ceramics. The housing is formed such that it has an inner surface and external surface and the inner surface forms a cavity configured to grip at least one wire inserted into the cavity and the cavity has an opening on the proximal end to receive at least one wire or cable and is enclosed on the distal end to prevent the at least one wire or cable from passing the full length of the housing and exposing the at least one wire or cable. The at least one wire or cable can be insulated or stripped. The external surface of the housing can be shaped in a conical, tapered, rectangular, or square shape. The external surface has a tongue which projects from the proximal end of the housing and the tongue has a clip at its proximal end. The clip is enabled to attach to the at least one wire thereby holding the at least one wire firmly to the housing such that it cannot be unintentionally removed from the cavity. The housing inner surface cavity can be fitted with metal, rubber, or plastic connector pieces or the inner cavity can have a holding mechanism molded into the cavity to hold the at least one wire or cable. The connector pieces can include threaded plastic, threaded metal, crimp connectors, metal casing, ceramic connectors and any future conductive or non-conductive wiring or cabling connector or holder that joins two or more wires or cables together.

In one embodiment the invention can include a housing with a rotating mechanism to twist and join wiring or cables together. In another embodiment the invention can include housing with a clamping mechanism such as a cylinder with an inner cavity lined with thin conductive material. The thin conductive material capable of being crushed to clamp the wires in the inner cavity to join them. The instant invention housing can be made from flame resistant material to prevent further hazard in the case of incorrect wiring by the user. The instant invention housing includes various sizes to accommodate several wire gauge types and thicknesses. The instant invention can also include designs that include rows of modules for cabling or wiring to be fastened such as screw terminals, or pinch terminals.

In another embodiment the instant invention includes at least one clipping mechanism such as a non-releasable fastener such as a zip tie, or cable ties, and are also known as zip ties or tie wraps. A first fastener can be a separate device or molded or inserted to the outer surface of a connector. The first fastener attaches the connector to the holding fixture and a second fastener secures the wires to the proximal end of the holding fixture such that the connector is fastened to the wires by the union of the holding fixture and first fastener and second fastener. The non-releasable fastener enables the user pull or join the wires with a secondary method to ensure that the wires are securely joined by tightly clamping the wires to the connector in order render them stationary. Alternatively, the instant invention can include two or more non-releasable fasteners that are joined or molded together where one end of the fastener tightly grasps the wiring or cables which are inserted in the proximal end of the connector and the holding fixture and the other tightly grasps the outer surface of the connector's housing. The cinching device or holding fixture minimizes the possibility of wires pulling out of wire nuts or connectors.

In another embodiment the instant invention is designed with removable fasteners such as but not limited to a rubber band or other elastic and flexible restraints. Wherein the removable fastener can clamp down the insulating portion of the wires or cabling to a connector such as a wire nut, connector or crimp.

In another embodiment, the instant invention is designed with an extension, where in the extension tab is molded or attached by a fastener to an insulating housing. A through hole is molded or attached such that the tab forms an extension to the connector or wire nut and facilitates connecting a cable tie, and are also known as zip tie or tie wraps to the connector which can be used to secure the wires to the connector. The through hole tab designed with a tunnel of varying sizes to allow a fastener such as a zip tie, string, rubber band, or other fastener type to pass through and tightly fasten cabling to a connector such as a connector.

In yet another embodiment, the instant invention utilizes a ring in conjunction with an electrical connector. The ring is molded into the housing of the wire nut or other connector. The walls fashioned with a groove for the ring to sit stationary during use of the connector. The ring with an extension which protrudes toward the cables or wires of the connectors. The ring is able to collapse with an appropriate force, causing the wiring or cables to be pinched and therefore fastened to the connector. In addition, the ring can be in the shape of a cylinder with indications of where to pinch the ring in one or more locations along the cylinder wall and also where the cables or wires may pass through and into the wire connector. The ring can be formed from metal, plastic or ceramic material.

In yet another embodiment, the instant invention can utilize heat shrink wrap or tube. The heat shrink wrap or tube is molded to the instant invention housing and conforms to the overall shape of the outer wall of the connector portion of the invention. The heat shrink when in contact with a heat source shrinks in size to tightly clamp the cables or wires to the connector and prevent them from falling out. Additionally, the shrink wrap serves a dual purpose of preventing water or moisture from coming into contact with live electrical leads. The cinching device minimizes the possibility of wires pulling out of connector housing.

In yet another embodiment, the instant invention is a cinchable attachment that is molded or a standalone unit to secure a male plug into a female receptor, or a female plug into a male receptor end. This embodiment of the instant invention can utilize a cinchable fastener to secure two-part cable and plugs together. The cinchable attachment is able to be adjusted to safely secure cables from falling out of their receptacles. The cinchable attachment using a zip tie, wire tie, heat shrink material, pull cord tie, or crimp connector to secure cables and connectors together. The cinchable attachment able to serve a dual purpose as doubling as an organizer for applications where multiple strands or cables are used. The cinchable attachment of the instant invention fitted can alternatively have an attached surface that can be used for labeling or other identification methods. The instant invention in this embodiment is able to secure wall plugs, headphone outlets, electrical cabling, computer cables, audio cables, TV cables, auto wiring or cabling, smart device wiring or cabling, electronic circuit device wiring or cabling, equipment cabling or wiring, and any other cable or connectors which have male and female parts that connect to each other.

The instant invention comprises the following components:

A connector having a housing and inner cavity;

At lease one wire inserted into the inner cavity of the connector;

A holding fixture attached to the connector housing;

The holding fixture connected to the at least one wire.

The instant invention can be summarized as a restraining device for connecting at least one wire to an electrical connector. The electrical connector having a distal end and a proximal end, and the electrical connector has an electrical connector cavity at the electrical connector proximal end. The electrical connector also has an electrical connector housing surrounding the electrical connector cavity and the electrical connector has a primary axis that runs from the electrical connector proximal end to the electrical connector distal end.

The instant invention has three primary components first wire clipping device, a second wire clipping device and a holding fixture. The holding fixture has a holding fixture proximal end and a holding fixture distal end. The holding fixture distal end is located proximal to the electrical connector proximal end. The holding fixture is parallel to the electrical connector primary axis;

The electrical connector is designed to capture at least one wire and the at least one wire has a proximal end and a distal end and the electrical connector cavity removably holds the distal end of the at least one wire.

The first wire clipping device is attached to said electrical connector housing and said holding fixture.

The second wire clipping device is attached to said holding fixture proximal end and said at least one wire such that the restraining device holds the at least one wire from coming out of the electrical connector cavity proximal end.

The electrical connector can be selected from any suitable connector such as a wire nut, nut, connector, crimp connectors, metal casing, ceramic connectors or screw connectors.

The first wire clipping device can be selected from any suitable clipping device such as but not limited to a zip tie, wire tie, tie wrap, heat shrink material, snap clip, circle clip, e-clips, pull cord tie, clamp or crimp connector.

The second wire clipping device can be selected from any suitable clipping device such as but not limited to a zip tie, wire tie, tie wrap, heat shrink material, snap clip, circle clip, e-clips, pull cord tie, clamp or crimp connector.

The holding fixture in a preferred embodiment has a holding fixture primary axis which runs from the proximal end of the holding fixture to the distal end of the holding fixture.

The holding fixture in a preferred embodiment in an alternative embodiment has a holding fixture ring located at the distal end of said holding fixture and perpendicular to said holding fixture primary axis of said holding fixture ring fits over said electrical connector distal end. The ring can be either a complete ring or split.

Ideally, the holding fixture has a leg at the proximal end of the holding fixture and said leg is perpendicular from the primary axis of the holding fixture. The leg has a free end and a fixed end, and the fixed end is attached to the proximal end of the holding fixture. The holding fixture free end leg is perpendicularly distal from the proximal end of the holding fixture and distal from the electrical connector primary axis when the holding fixture ring is positioned over the electrical connector distal end.

The holding fixture holding fixture ring located at the distal end of said holding fixture and perpendicular to the holding fixture primary axis of said holding fixture ring fits over said electrical connector distal end and the holding fixture ring is a split ring so that the split ring is open and said ring is only 300 degrees of a full circle.

The holding fixture is made of a nonconductive material and the nonconductive material can be selected from any suitable material including but not limited to paper, glass, rubber, porcelain, ceramic, plastic, wood and plant materials.

The holding fixture can alternatively be formed from a sheet of plastic with a hole in the middle where the hole is designed to fit over the electrical connector distal end. The hole can be reinforced to prevent tearing. The sheet of plastic also provides the holding fixture the ability to insulate the connection so that a foreign object cannot enter the connector and result in an electrical short of an alternative path for the electrical current which could result in a fire or other problem.

Another advantage is that the parts can be assembly into a kit. This makes the installation simple and easy for the user because the parts necessary to connect the wires together using the instant invention are in one simple to use package.

The instant invention is a restraining device for connecting at least one wire to an electrical connector and the electrical connector having a distal end and a proximal end and the electrical connector having an electrical connector cavity at the electrical connector proximal end and an electrical connector housing surrounding the electrical connector cavity and the electrical connector having a primary axis that runs from the electrical connector proximal end to the electrical connector distal end. The restraining device comprises a removable first clipping device, a removable second clipping device and a polymer sheet. The polymer sheet having a polymer sheet proximal end and a polymer sheet distal end. The polymer sheet distal end located proximal to the electrical connector proximal end where the polymer sheet is attached to said electrical connector such that it covers the electrical connector along the electrical connector primary axis. The at least one wire has a proximal end and a distal end where the electrical connector cavity removably holds the distal end of the at least one wire. The first clipping device is attached to the electrical connector housing and the polymer sheet and the second clipping device is attached to the polymer sheet proximal end and the at least one wire. The restraining device holds said at least one wire from coming out of said electrical connector cavity proximal end.

The restraining device wherein the polymer sheet has a polymer sheet hole which forms said distal end of said polymer sheet when said polymer sheet hole is placed over the electrical connector distal end.

The restraining device wherein the polymer sheet has a polymer sheet hole and said polymer sheet hole is reinforced with a ring which forms the distal end of the polymer sheet when the polymer sheet hole is placed over the electrical connector distal end.

The restraining device wherein the polymer sheet is selected from the group consisting of vinyl, nylon, polypropylene and nylon.

The restraining device wherein the electrical connector is selected from the group consisting of wire nut, nut, connector, crimp connectors, metal casing, ceramic connectors and screw connectors.

The restraining device wherein the first clipping device is selected from the group consisting of zip tie, wire tie, tie wrap, heat shrink material, snap clip, circle clip, e-clips, pull cord tie, clamp and crimp connector.

The restraining device wherein the second clipping device is selected from the group consisting of zip tie, wire tie, tie wrap, heat shrink material, snap clip, circle clip, e-clips, pull cord tie, clamp and crimp connector.

Alternatively, the instant invention is a restraining device for connecting at least one wire to an electrical connector and the electrical connector having a distal end and a proximal end. The electrical connector having an electrical connector cavity at the electrical connector proximal end and an electrical connector housing surrounding the electrical connector cavity and the electrical connector having a primary axis that runs from the electrical connector proximal end to the electrical connector distal end. The restraining device comprises a removable first clipping device, a removable second clipping device and a holding fixture and the holding fixture having a holding fixture proximal end and a holding fixture distal end. The holding fixture distal end located proximal to the electrical connector proximal end and the holding fixture is parallel to the electrical connector primary axis. The holding fixture having a proximal appendage located at the holding fixture proximal end and a distal appendage located at the holding fixture distal end.

The at least one wire has a proximal end and a distal end where the electrical connector cavity removably holds the distal end of the at least one wire.

The first clipping device attached to the electrical connector housing and the holding fixture where the second clipping device is attached to the holding fixture proximal end and the at least one wire.

The restraining device holds the at least one wire from coming out of the electrical connector cavity proximal end.

The restraining device wherein the holding fixture has a holding fixture primary axis which runs from the proximal end of the holding fixture to the distal end of the holding fixture.

The restraining device wherein the electrical connector is selected from the group consisting of wire nut, nut, connector, crimp connectors, metal casing, ceramic connectors and screw connectors.

The restraining device wherein the first clipping device is selected from the group consisting of zip tie, wire tie, tie wrap, heat shrink material, snap clip, circle clip, e-clips, pull cord tie, clamp and crimp connector.

The restraining device wherein the second clipping device is selected from the group consisting of zip tie, wire tie, tie wrap, heat shrink material, snap clip, circle clip, e-clips, pull cord tie, clamp and crimp connector.

The restraining device wherein the holding fixture having the proximal appendage is a first leg at the proximal end of the holding fixture and the first leg is perpendicular from the primary axis of the holding fixture where the first leg has a free end and a fixed end and the fixed end is attached to the proximal end of the holding fixture and the free end of the first leg is perpendicularly distal from the proximal end of the holding fixture and distal from the electrical connector primary axis when the holding fixture is position over the electrical connector distal end.

The restraining device wherein the holding fixture having the distal appendage is a second leg at the distal end of the holding fixture and the second leg is perpendicular from the primary axis of the holding fixture and the second leg has a free end and a fixed end and the fixed end is attached to the distal end of the holding fixture and the free end of the second leg is perpendicularly distal from the distal end of the holding fixture and distal from the electrical connector primary axis when the holding fixture is position over the electrical connector distal end.

The restraining device wherein the holding fixture is made of a nonconductive material.

The restraining device wherein the holding fixture nonconductive material is selected from the group consisting of paper, glass, rubber, porcelain, ceramic, plastic, wood and plant materials.

The restraining device wherein the holding fixture having the distal appendage and the proximal appendage shape is selected from the group consisting of a rectangle, square, sphere, circle, hexagon, pentagon and trapezoidal shapes.

A restraining device for connecting at least one wire to an electrical connector comprising of an electrical connector having a distal end and a proximal end and the electrical connector having an electrical connector cavity at the electrical connector proximal end and an electrical connector housing surrounding the electrical connector cavity and the electrical connector having a primary axis that runs from the electrical connector proximal end to the electrical connector distal end and the holding fixture having a nonremovable first clipping device, a removable second clipping device and a holding fixture.

The holding fixture having a holding fixture proximal end and a holding fixture distal end, and the holding fixture distal end located proximal to the electrical connector proximal end and the holding fixture is parallel to the electrical connector primary axis and the nonremovable first clipping device of the holding fixture fits over the electrical connector.

The holding fixture having a proximal appendage located at the holding fixture proximal end and the proximal appendage shape is selected from the group consisting of a rectangle, square, sphere, circle, hexagon, pentagon and trapezoidal shapes.

The at least one wire has a proximal end and a distal end and the electrical connector cavity removably holds the distal end of the at least one wire.

The second clipping device is attached to the holding fixture proximal end and the at least one wire and the restraining device holds the at least one wire from coming out of the electrical connector cavity proximal end.

The restraining device wherein the holding fixture has a holding fixture primary axis which runs from the proximal end of the holding fixture to the distal end of the holding fixture.

The restraining device wherein the nonremovable first clipping device is a closed ring.

The restraining device wherein the nonremovable first clipping device is a split ring and the split ring is open and the ring is only 300 degrees of a full circle.

The restraining device wherein the electrical connector is selected from the group consisting of wire nut, nut, connector, crimp connectors, metal casing, ceramic connectors and screw connectors.

The restraining device wherein the second clipping device is selected from the group consisting of zip tie, wire tie, tie wrap, heat shrink material, snap clip, circle clip, e-clips, pull cord tie, clamp and crimp connector.

The restraining device wherein the holding fixture the nonremovable first clipping device is at the proximal end of the holding fixture and the nonremovable first clipping device is perpendicular from the primary axis of the holding fixture and the nonremovable first clipping device has a free end and a fixed end and the fixed end is attached to the proximal end of the holding fixture and the free end of the nonremovable first clipping device is perpendicularly distal from the proximal end of the holding fixture and distal from the electrical connector primary axis when the holding fixture is position over the electrical connector distal end.

The restraining device of wherein the holding fixture has the proximal appendage is a second leg at the distal end of the holding fixture and the second leg is perpendicular from the primary axis of the holding fixture and the second leg has a free end and a fixed end and the fixed end is attached to the distal end of the holding fixture and the free end of the second leg is perpendicularly distal from the distal end of the holding fixture and distal from the electrical connector primary axis when the holding fixture is position over the electrical connector distal end.

The restraining device wherein the holding fixture is made of a nonconductive material.

The restraining device wherein the holding fixture nonconductive material is selected from the group consisting of paper, glass, rubber, porcelain, ceramic, plastic, wood and plant materials.

Referring now to FIGS. 1-27 and initially FIG. 1 which is a schematic of an embodiment of the instant invention showing a top view and a side view of the same embodiment. The connector 100 has clip 151 which is located on the distal end of holding fixture 175 and attached to connector 100 and clip 150 which is located on the proximal end of holding fixture 175 and attached to wire 850 and wire 855. The holding fixture 175 and clip 151 can be made from any suitable nonconductive material such as plastic polymer including but not limited to vinyl, nylon, polypropylene, polyester, polyethylene or paper, glass, rubber, porcelain, ceramic, plastic, wood, plastic coated metal or plant materials.

The clip 150 and clip 151 can be a zip tie, wire tie, tie wrap, heat shrink material, snap clip, circle clip, e-clips, pull cord tie, clamp or crimp connector.

Figure 2:
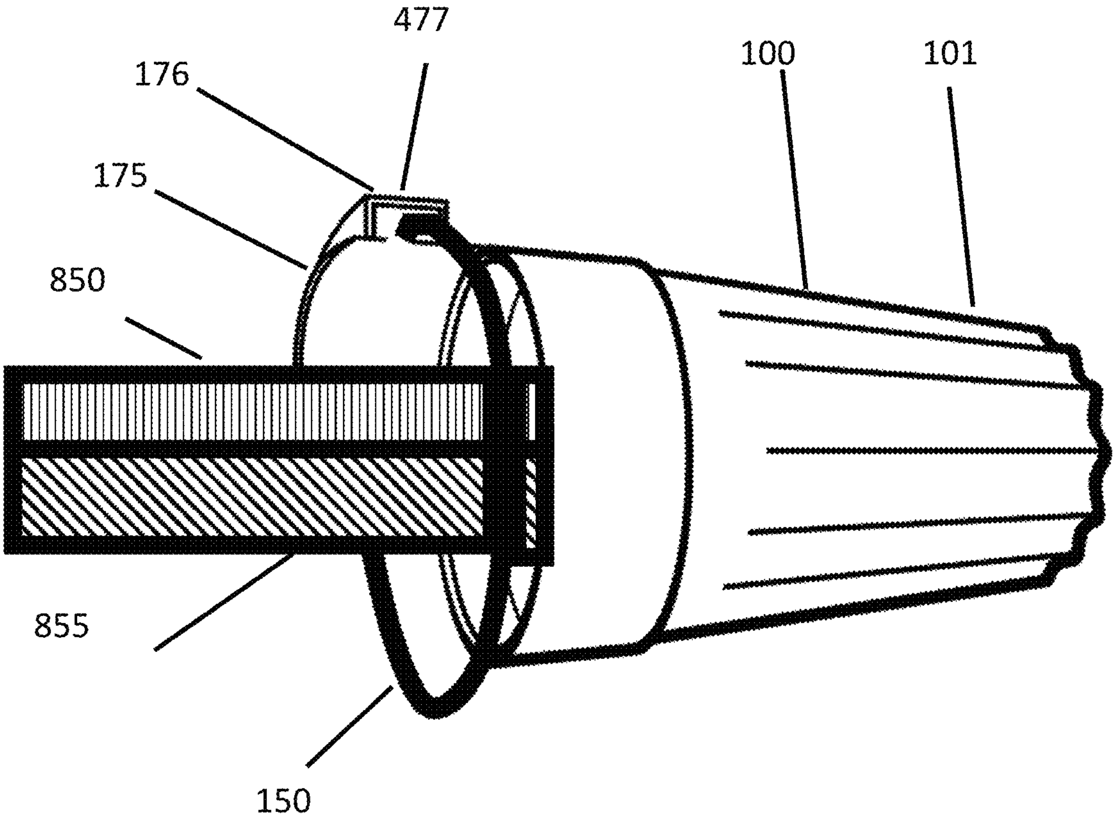
FIG. 2 is a schematic of the side view of an alternative embodiment of the instant invention utilizing an extension with a through hole.

FIG. 2 is a schematic side view of an alternative embodiment of the instant invention utilizing an extension 477 which is part of connector 100 with a through hole 176. The extension 477 provides a holding fixture 175 which is formed as part of the connector 100 housing 101. The clip 150 attaches to a hole 176 in holding fixture 175 and secures wires 850 and wire 855. The connector 100 and clip 150 can be made from any suitable nonconductive material such as plastic polymer including but not limited to vinyl, nylon, polypropylene, polyester, polyethylene or paper, glass, rubber, porcelain, ceramic, plastic, wood, plastic coated metal or plant materials.

Figure 3:
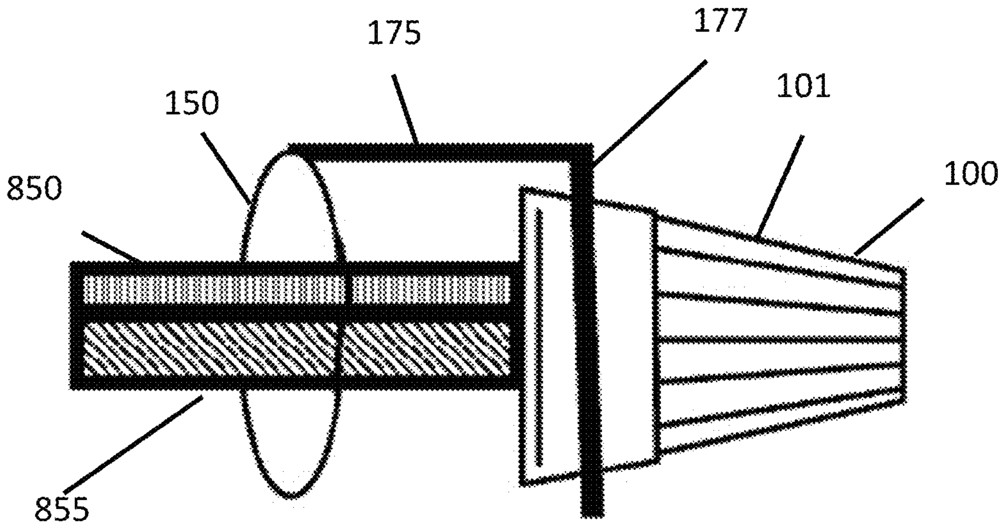
FIG. 3 is a schematic of the side view of an alternative embodiment of the instant invention utilizing an embedded ring that serves to prevent movement of cabling or wires when used with a connector.

FIG. 3 is a schematic side view of an alternative embodiment made from any suitable nonconductive material.

FIG. 3 is a schematic side view of an alternative embodiment of the instant invention utilizing a ring 177 which is part of the holding fixture 175 and ring 177 is configured to fit over connector 100 housing 101 such that it captures housing 101 in ring 177. The clip 150 attaches to holding fixture 175 and secures wires 850 and wire 855. The holding fixture 175 prevents movement of cabling or wires when used with a connector. The holding fixture 175 and clip 150 can be made from any suitable nonconductive material such as plastic polymer including but not limited to vinyl, nylon, polypropylene, polyester, polyethylene or paper, glass, rubber, porcelain, ceramic, plastic, wood, plastic coated metal or plant materials.

The clip 150 and clip 151 can be made from any suitable nonconductive device such as a zip tie, wire tie, tie wrap, heat shrink material, snap clip, circle clip, e-clips, pull cord tie, clamp or crimp connector.

Figure 4:
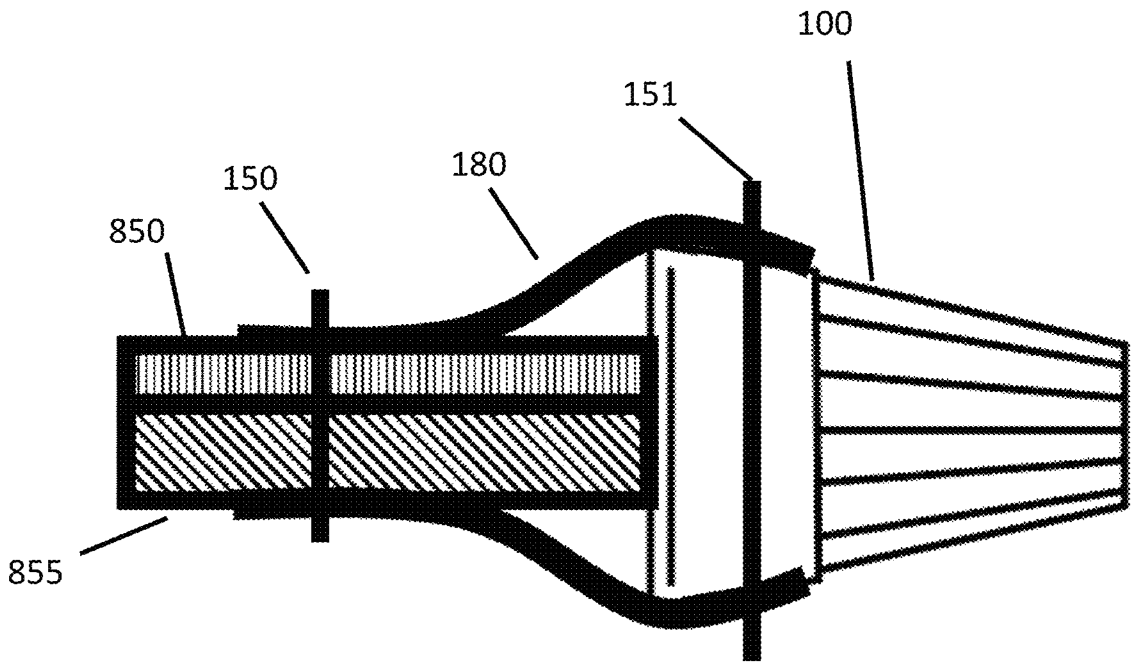
FIG. 4 is a schematic of the side view of an alternative embodiment of the instant invention utilizing heat sensitive wrap to secure cabling or wires.

FIG. 4 is a schematic side view of the instant invention utilizing heat sensitive wrap 180 to secure cabling or wires 850 and wire 855. The heat sensitive wrap 180 is placed over the connector 100 and heat is applied so as to secured the heat sensitive wrap 180 to the wires 850 and wire 855 using clip 150 and to secured heat sensitive wrap 180 to housing 100 using clip 151.

Figure 5:
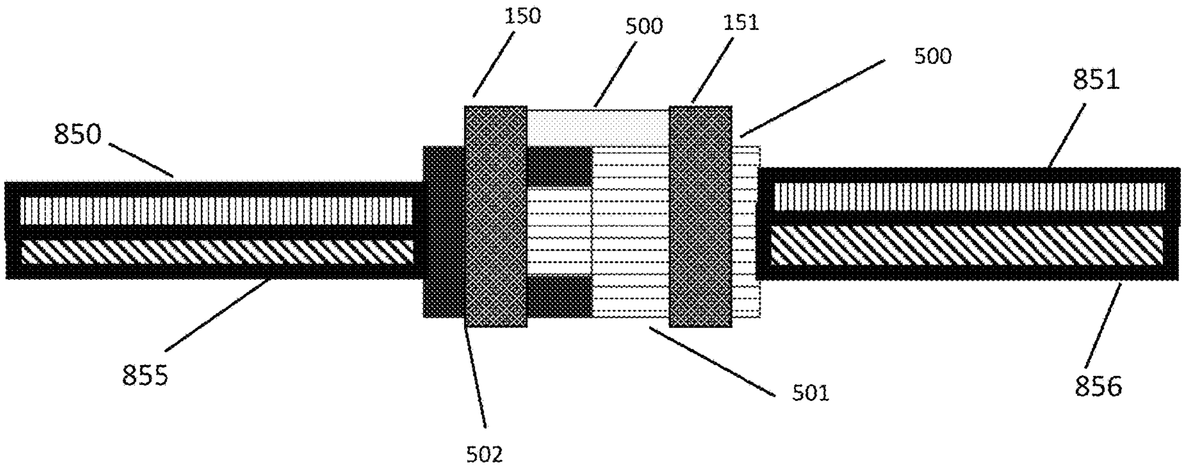
FIG. 5 is a schematic of the side view of an alternative embodiment of the instant invention utilizing a cinchable fastener to secure two-part cable and plugs together.

FIG. 5 is a schematic side view of the instant invention utilizing a cinchable fastener to secure two-part cable and plugs together. Holding fixture 500 is attached to female connector 502 having wires 850 and wire 855 using clip 150 and male connector 501 having wires 851 and wire 856 using clip 151. The holding fixture 500, clip 151 and clip 150 can be made from any suitable nonconductive material such as plastic polymer including but not limited to vinyl, nylon, polypropylene, polyester, polyethylene or paper, glass, rubber, porcelain, ceramic, plastic, wood, plastic coated metal or plant materials.

The clip 150 and clip 151 can be any suitable nonconductive device such as a zip tie, wire tie, tie wrap, heat shrink material, snap clip, circle clip, e-clips, pull cord tie, clamp or crimp connector.

Figure 6:
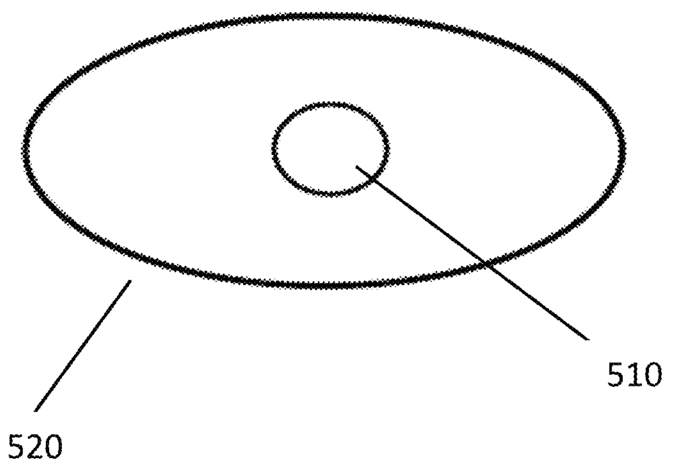
FIG. 6 shows an alternative device of the instant invention with a polymer hood.

FIG. 6 shows a plan view of an alternative device wherein the holding fixture is formed from a hood formed from a sheet of nonconductive material. The hood 520 has a hole 510 designed to fit over the connector 100 shown in FIG. 8. The hood 520 can be made from any suitable nonconductive material such as plastic polymer including but not limited to vinyl, nylon, polypropylene, polyester, polyethylene or paper, glass, rubber, porcelain, ceramic, plastic, wood or plant materials. The hood or sheet of plastic also provides the holding fixture the ability to insulate the connection so that a foreign object cannot enter the connector and result in an electrical short or an alternative path for the electrical current which could result in a fire or other problem.

Figure 7:
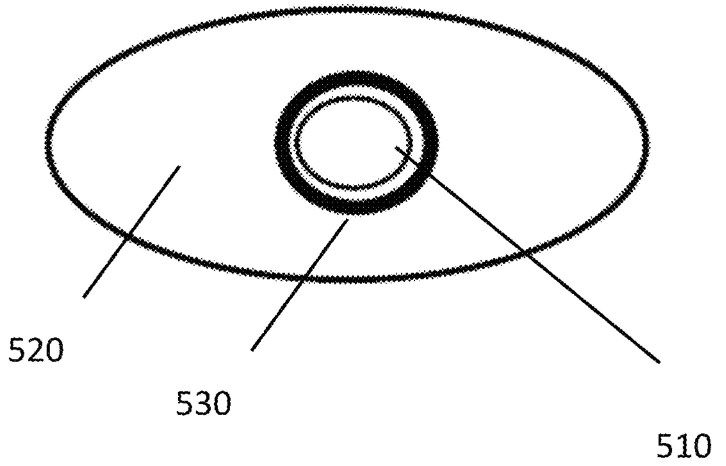
FIG. 7 shows an alternative device of the instant invention with a polymer hood and a reinforcing ring.

FIG. 7 shows a plan view of an alternative device wherein the holding fixture is formed from a hood formed from a sheet of nonconductive material. The hood 520 has a hole 510 designed to fit over the connector 100 shown in FIG. 8. The hood 520 has a reinforcing ring 530 which can be attached to the hood 520 with adhesive, ultrasonic welding, crimping, or any other fastening method. The reinforcing ring 530 and hood 520 can be made from any suitable nonconductive material such as plastic polymer including but not limited to vinyl, nylon, polypropylene, polyester, polyethylene or paper, glass, rubber, porcelain, ceramic, plastic, wood or plant materials. The hood or sheet of plastic also provides the holding fixture the ability to insulate the connection so that a foreign object cannot enter the connector and result in an electrical short of an alternative path for the electrical current which could result in a fire or other problem.

Figure 8:
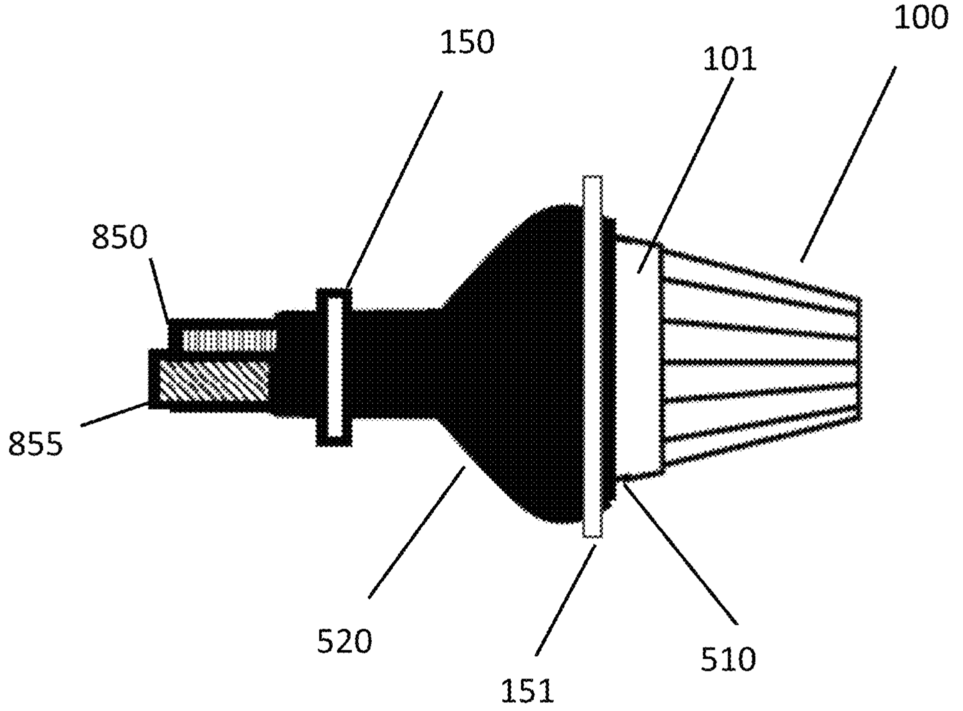
FIG. 8 shows the alternative device of FIG. 6 and FIG. 7 with a polymer hood placed over connector and with cinching device.

FIG. 8 shows a schematic side view of the alternative device shown in FIG. 6 and FIG. 7 with a hood 520 placed over connector 100 such that hole 510 fits over the housing 101 of connector 100. An optional clip 151 can secure the hood 520 to the connector 100. Clip 150 securing hood 520 to wires 850 and wire 855 using clip 150. Clip 150 and optional clip 151 can be any suitable nonconductive device such as a zip tie, wire tie, tie wrap, heat shrink material, snap clip, circle clip, e-clips, pull cord tie, clamp or crimp connector. The clip 150 minimizes the possibility of wires 850 and 855 pulling out of connector 100. The optional clip 151 if used secures the hood 520 to connector 100. The sheet of plastic also provides the holding fixture the ability to insulate the connection so that a foreign object cannot enter the connector and result in an electrical short of an alternative path for the—electrical current which could result in a fire or other problem.

Figure 9:
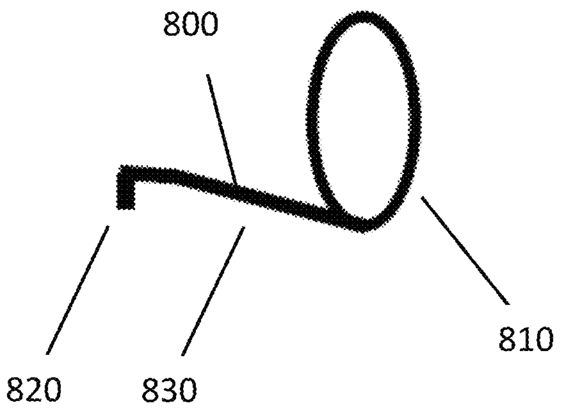
FIG. 9 shows an alternative embodiment of the instant invention which is a bracket that fits over a connector.
Figure 10:
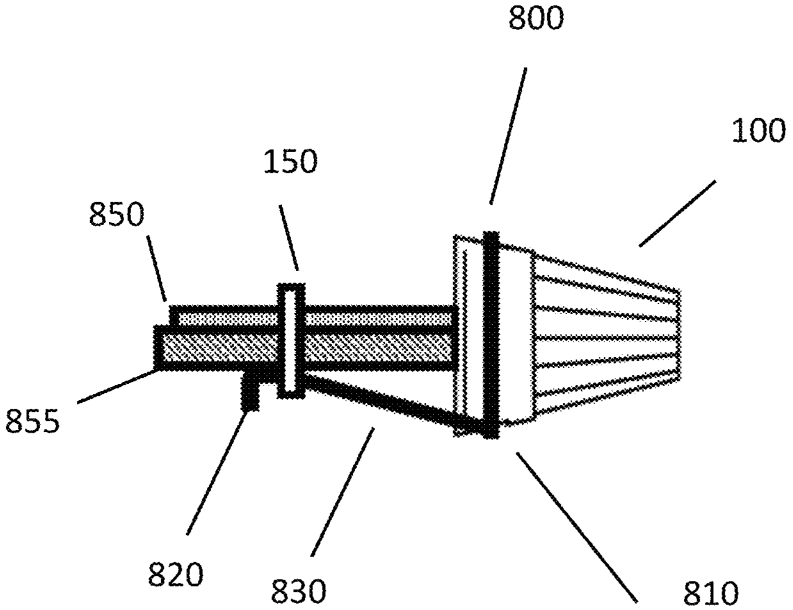
FIG. 10 shows an alternative embodiment of a device of the instant invention which is a bracket that fits over connector with cinching device.

FIG. 9 shows a schematic side view of an alternative device which is a bracket 800 that fits over connector 100 shown in FIG. 10. The bracket 800 comprises of ring 810, arm 830 and stop 820.

FIG. 10 shows a schematic side view of the alternative device of FIG. 9 installed on connector 100. Bracket 800 that fits over connector 100. Bracket 800 comprises of ring 810, arm 830 and stop 820. A clipping device 150 is placed over the arm 830 and proximal to stop 820. The stop 820 prevents the clipping device 150 from sliding off of the bracket 800. The clipping device 150 can be suitable nonconductive device such as a zip tie, wire tie, tie wrap, heat shrink material, snap clip, circle clip, e-clips, pull cord tie, clamp or crimp connector. The clipping device 150 minimizes the possibility of wires 850 and 855 pulling out of connector 100. The clipping device 150 can be made from any suitable nonconductive material such as paper, glass, rubber, porcelain, ceramic, plastic, wood or plant materials. The bracket 800 can be made from any suitable nonconductive material such as plastic polymer including but not limited to vinyl, nylon, polypropylene, polyester, polyethylene or paper, glass, rubber, porcelain, ceramic, plastic, wood, plastic coated metal or plant materials.

Figure 11:
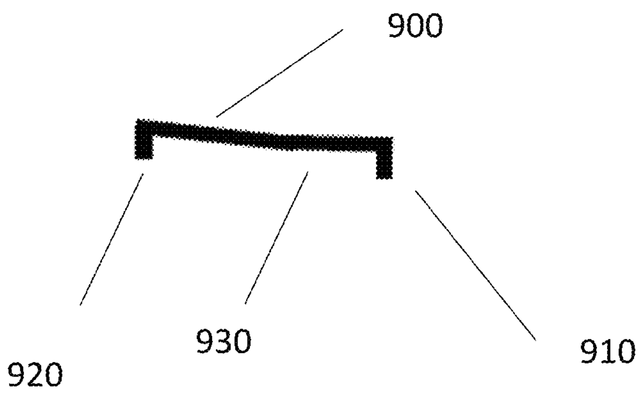
FIG. 11 shows an embodiment of the alternative device shown in FIG. 9 of the instant invention which is a bracket that fits over a connector with one cinching device to secure the connector and a second to secure the wires.
Figure 12:
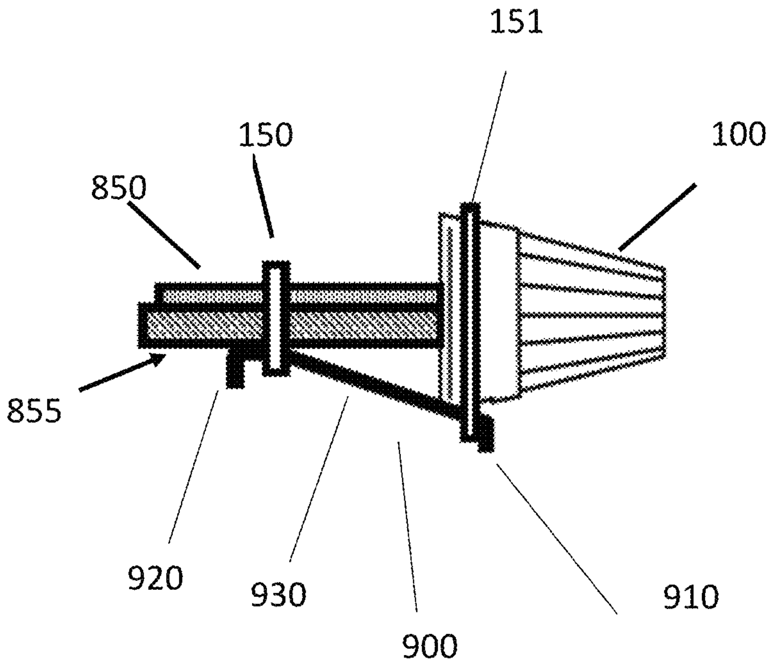
FIG. 12 shows an embodiment of an alternative device of the instant invention which is a bracket that fits over connector with one cinching device to secure the connector and a second to secure the wires.

FIG. 11 shows a schematic side view an alternative device which is a bracket 900 that fits over a connector 100 shown in FIG. 12. Bracket 900 comprises of stop 910, arm 930 and stop 920. The bracket 900 can be made from any suitable nonconductive material such as plastic polymer including but not limited to vinyl, nylon, polypropylene, polyester, polyethylene or paper, glass, rubber, porcelain, ceramic, plastic, wood or plant materials.

FIG. 12 shows a schematic side view of the alternative device of FIG. 11 which is a bracket 900 that fits over connector 100. Bracket 900 comprises of stop 910, arm 930 and stop 920. A clipping device 150 is placed over the arm 930 and the stop 920 prevents the clipping device 150 from sliding off of the bracket 900. A clipping device 151 is placed over the arm 930 and the stop 910 prevents the clipping device 151 from sliding off of the bracket 900 and the combination of bracket 900 and clipping device 151 and clipping device 150 hold connector 100 and wires 850 and 855 pulling out of connector 100. The clipping device 150 and 151 can be any suitable device such as a clip or tie wrap.

Figure 13:
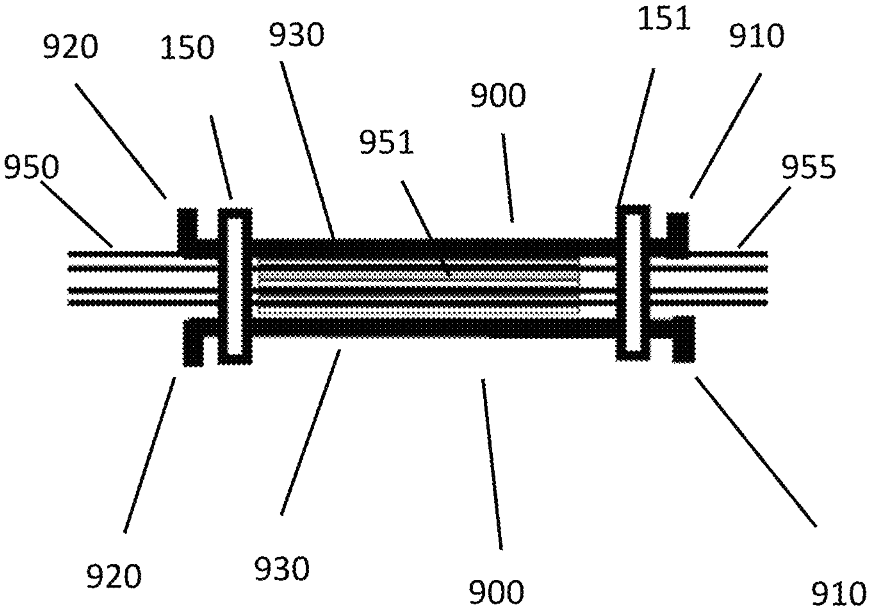
FIG. 13 shows an embodiment of an alternative device of the instant invention configured to provide strain relief for fiber optic connections.

Another aspect of the instant invention is the ability to provide stain relieve for fiber optic connections. The instant invention can be used to provide strain relieve for single connection or a bundle of connections. FIG. 13 shows a device of the instant invention used with a fiber optic cable to relieve the strain on the splice of the fiber optic strands. The fiber optic strands are typically shown as 950 typical left strand and 955 typical right strand. Only one strand on the left and one on the right are identified for clarity purposes. The strands 950 and 951 are spliced which is shown as typical splice 951. Splice 951 connects the strands 950 and 951. At least one bracket 900 which comprises of stop 910, arm 930 and stop 920. A clipping device 150 is placed over the arm 930 and the stop 920 prevents the clipping device 150 from sliding off of the bracket 900. A clipping device 151 is placed over the arm 930 and the stop 910 prevents the clipping device 151 from sliding off of the bracket 900. The combination of at least one bracket 900 and clipping devices 150 and 151 minimize the strand applied to the typical splice 951. Bracket 900 can be made from any suitable nonconductive material such as plastic polymer including but not limited to vinyl, nylon, polypropylene, polyester, polyethylene or paper, glass, rubber, porcelain, ceramic, plastic, wood, plastic coated metal or plant materials.

Figure 14:
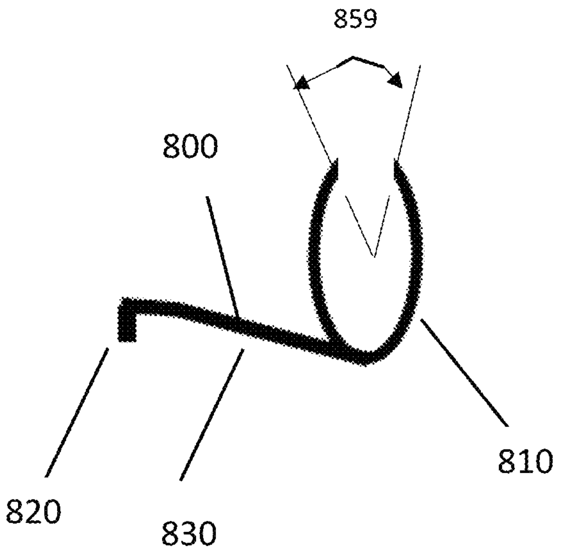
FIG. 14 shows an embodiment of an alternative device of the instant invention which is a bracket that fits over connector shown in FIG. 10.

FIG. 14 shows a side view of an alternative device which is a bracket 800 that fits over connector 100 shown in FIG. 10. The bracket 800 comprises of ring 810, arm 830 and stop 820. Ring 810 is split in that it has a piece missing at the top of the ring and distal from arm 830. The angle 859 can be from 90 to 30 degrees but preferably 60 degrees and the angle midpoint should be at 180 degrees from where the arm 830 and ring 810 intersect. The split ring allows the ring to conform to a number of different sizes of wire nuts or connectors. Bracket 800 can be made from any suitable nonconductive material such as plastic polymer including but not limited to vinyl, nylon, polypropylene, polyester, polyethylene or paper, glass, rubber, porcelain, ceramic, plastic, wood, plastic coated metal or plant materials.

Figure 15:
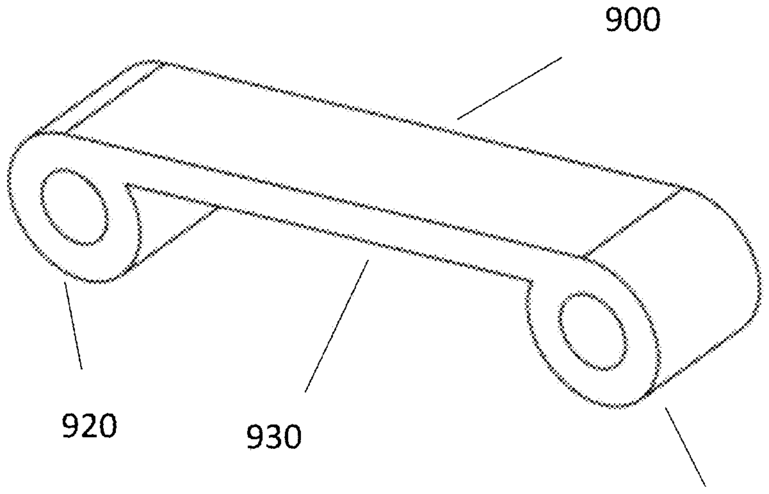
FIG. 15 shows an embodiment of an alternative device of the instant invention which is a bracket formed from an extruded.

FIG. 15 shows a side view of an alternative device which is a bracket 900. The bracket 900 can be formed from an extruded shape. The bracket 900 fits over connector 100 shown in FIG. 16. The bracket 900 comprises of ring 910, arm 930 and ring 920. Bracket 900 can be made from any suitable nonconductive material such as plastic polymer including but not limited to vinyl, nylon, polypropylene, polyester, polyethylene or paper, glass, rubber, porcelain, ceramic, plastic, wood, plastic coated metal or plant materials.

Figure 16:
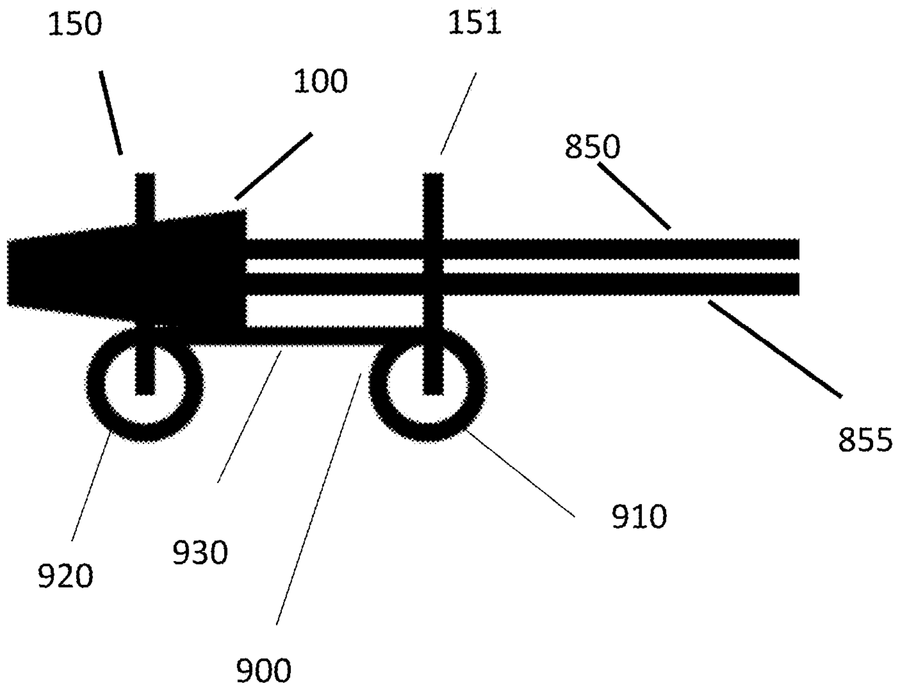
FIG. 16 shows an embodiment of an alternative device of the instant invention of FIG. 15 which is a bracket formed from an extrusion.

FIG. 16 shows a side view of the alternative device of FIG. 15 which is a bracket 900 that fits over connector 100. Bracket 900 comprises of ring 910, arm 930 and ring 920. A clipping device 150 is placed through the ring 920 and ring 920 prevents the clipping device 150 from sliding off of the bracket 900. A clipping device 151 is placed through the ring 930 and the ring 910 prevents the clipping device 151 from sliding off of the bracket 900 and the combination of bracket 900 and clipping device 151 and clipping device 150 hold connector 100 and wires 850 and 855 from pulling out of connector 100. The clipping device 150 and 151 can be any suitable device such as a clip or tie wrap.

Figure 17:
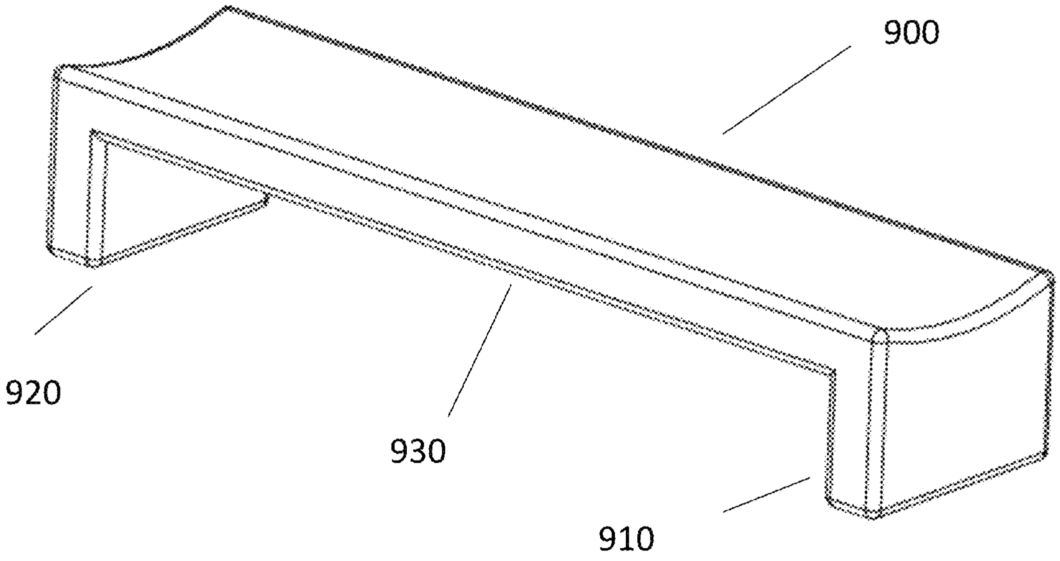
FIG. 17 shows an embodiment of an alternative device of the instant invention which is a bracket formed from an extrusion.

FIG. 17 shows a side view of an alternative device which is a bracket 900. This bracket can be formed from an extruded shape. The bracket 900 that fits over connector 100 shown in FIG. 16. The bracket 900 comprises of stop 910, arm 930 and stop 920. Bracket 900 can be made from any suitable nonconductive material such as plastic polymer including but not limited to vinyl, nylon, polypropylene, polyester, polyethylene or paper, glass, rubber, porcelain, ceramic, plastic, wood, plastic coated metal or plant materials.

Furthermore, the alternative device shown in FIG. 17 is a bracket 900. The bracket 900 can be formed from an extruded shape. The bracket 900 comprises of an arm 930 and appendage or stop 910 and appendage or stop 920. The appendage or stop 910 and appendage or stop 920 can be a ring or loop as shown in FIG. 16 or legs as shown in FIG. 17. The legs can be made from a variety of shapes including rectangle, sphere, square, triangle, or any other structure that provides resistance to the clipping device 150 and clipping device 151 (shown in FIG. 18) from sliding off the bracket 900 arm 930. The bracket 900 that fits over connector 100 shown in FIG. 18. The bracket 900 comprises of stop 910, arm 930 and stop 920.

Figure 18:
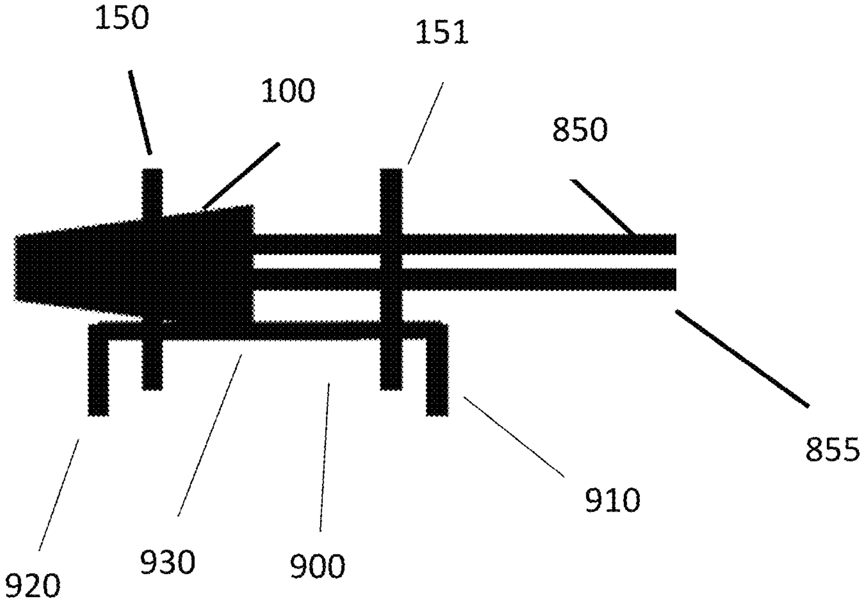
FIG. 18 shows an embodiment of an alternative device of the instant invention of FIG. 17 which is a bracket formed from an extrusion.

FIG. 18 shows a schematic side view of the alternative device of FIG. 17 which is a bracket 900 that fits over connector 100. Bracket 900 comprises of appendage or stop 910, arm 930 and appendage or stop 920. A clipping device 150 is placed over the arm 930 and the stop 920 prevents the clipping device 150 from sliding off of the bracket 900. A clipping device 151 is placed over the arm 930 and the stop 910 prevents the clipping device 151 from sliding off of the bracket 900 and the combination of bracket 900 and clipping device 151 and clipping device 150 hold connector 100 and wires 850 and 855 pulling out of connector 100. The clipping device 150 and 151 can be any suitable device such as a clip or tie wrap.

Figure 19:
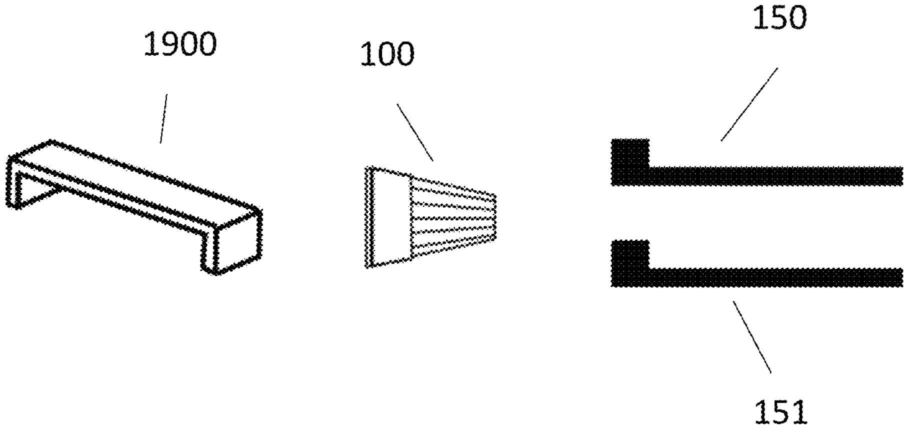
FIG. 19 shows the instant invention assembled into a kit using a bracket.

As shown in FIG. 19 an advantage of the instant invention is that the parts can be assembled into a kit. This makes the installation simple and easy for the user because the parts necessary to connect the wires together using the instant invention are in one simple to use package. One embodiment of the kit will comprise of bracket 1900, clipping device 150, clipping device 151, and connector 100. This allows the user to have all the parts need to make a secure connection. The bracket 1900 can be selected from bracket 900, holding fixture 175, holding fixture 500, bracket 800 or any other holding fixture.

Figure 20:
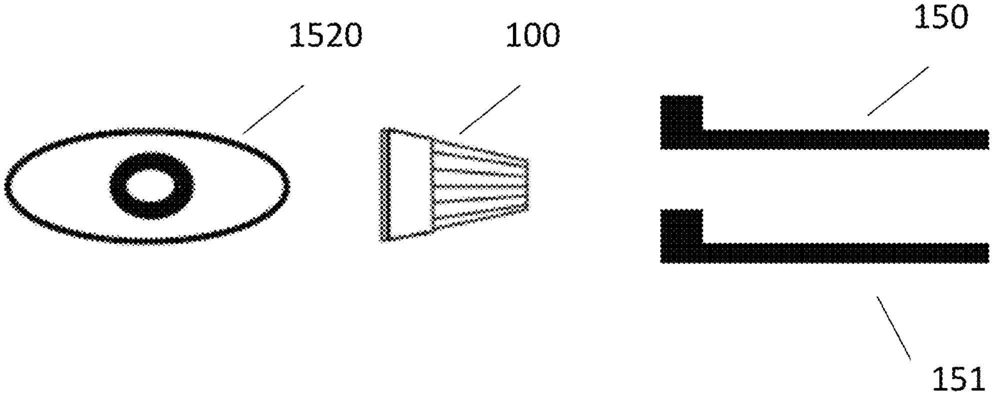
FIG. 20 shows the instant invention assembled into a kit using a hood.

An alternative as shown in FIG. 20 the kit could include hood 1520, clipping device 150, clipping device 151, and connector 100. Hood 1520 can have a reinforcing ring 503 or not have a reinforcing ring and only hole 510.

Figure 21:
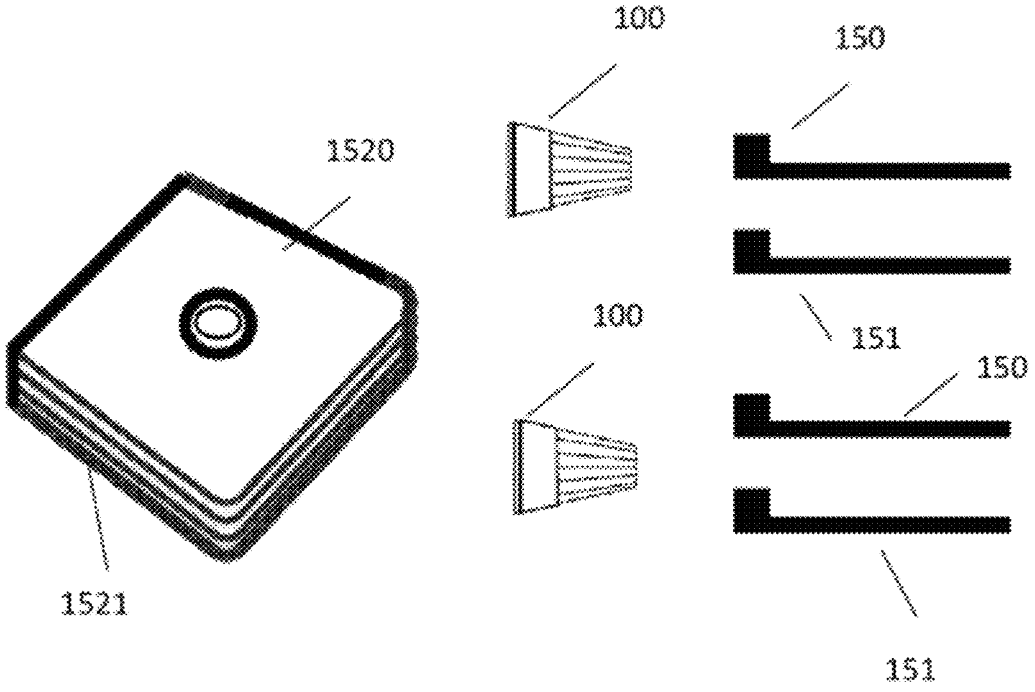
FIG. 21 shows the instant invention assembled into a booklet kit.

The kit can alternatively be configured as shown in FIG. 21 such that there is a quantity of hood 1520 provided in a booklet 1521 such that there is more that one hood 1520 in the booklet 1521. An individual hood could be removed from the booklet when need similar to a pad of post-it notes. The kit also contains a quantity of clipping device 150, clipping device 151, and connector 100 in a single package Alternatively, any of the kits envisioned can have a user manual and a package.

The instant invention in yet another embodiment utilizes a securing method such as a cinchable tie or clip, heat shrink wrap, or other future fastener types and designs to secure electrical bulbs into place for automotive vehicles. The instant invention fitted with a tunnel on one end able to fit over a socket for a bulb and an additional tunnel on the other end able to be secured and fitted to a bulb head to hold the socket and bulb together.

Figure 22:
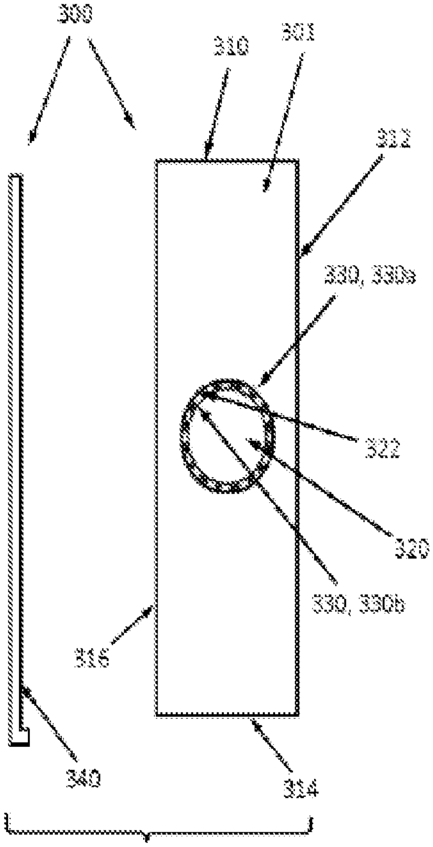
FIG. 22 shows an alternative device of the instant invention with an insulative flexible sheet.
Figure 23:
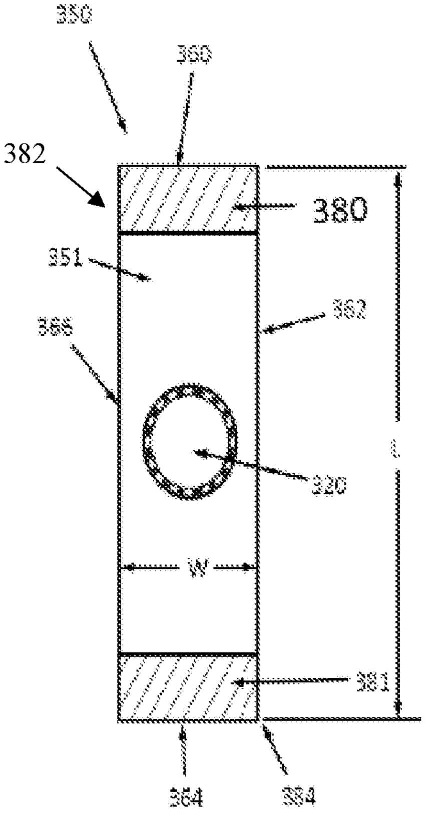
FIG. 23 shows an alternative device of the instant invention with another insulative flexible sheet.
Figure 25:
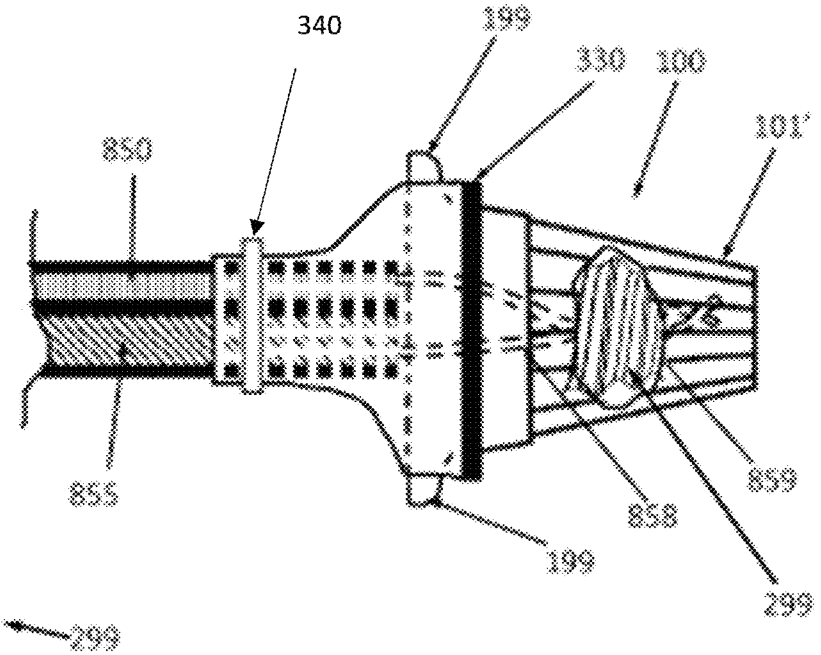
FIG. 25 shows a cutaway view of the insulative flexible sheet of FIG. 21 installed on a wire connector using the elongated sheet securing device.
Figure 27:
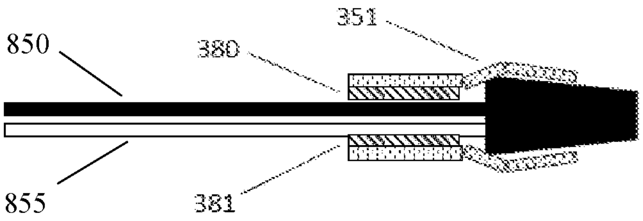
FIG. 27 is a side elevational view of the wire connector attached to an alternative device of the instant invention with insulative flexible sheet and adhesive.

Another embodiment of the present invention is a restraining device 300 for securing at least one wire to an electrical connector 100 shown in FIG. 25. The electrical connector 100 includes an insulative housing 101 having a housing outer surface, a first end and a second end opposite the first end. The housing 101 includes a cavity extending inwardly from an opening in said first end of the housing for the terminal end 858, 859 of the one wire or plurality of wires. The restraining device 300 shown in FIG. 22 includes an insulative flexible sheet 301 having a sheet perimeter 310, 312, 314, 316 and a sheet opening 320 disposed within said sheet perimeter. The sheet opening 320 includes sheet opening edge or rim 322, the sheet opening 322 being engageable with the electrical connector housing outer surface. The restraining device 300 includes an elongated flexible sheet securing device 340 having a length and which is extendable and securable around said at least one wire and a portion of the flexible sheet adjacent a portion of the sheet perimeter when the portion of the flexible sheet is extended from the connector housing, past the connector first end and along the at least one wire first end when the flexible sheet restraining device holds said at least one wire from coming out of the electrical connector cavity. Securing device 340 can be selected from the group consisting of zip tie, wire tie, tie wrap, heat shrink material, snap clip, circle clip, e-clips, pull cord tie, clamp and crimp connector. The sheet opening includes an opening edge 322 (shown in dotted lines to show that the opening edge 322 is secured between the inner diameter 330*b* and outer diameter 330*a* of the optional reinforcement ring 330). The sheet opening 320 may include a reinforcement ring 330 secured along said opening edge 322, the reinforcement ring 330 is selected such that it prevents the sheet opening 320, opening edge 322 or flexible sheet 301 from damage during installation or use. The restraining device may include adhesive on at least a portion of the flexible sheet which extends along the at least one wire when the flexible sheet is fit over the wire connector first end. The flexible sheet may be a sheet strip as shown in FIGS. 22 and 23 having strip ends extendable to the at least one wire. The strip ends may include an adhesive 380, 381 for securing the strip ends 360, 364 to the wire. The adhesive 380 may be adhered to a first portion 382 and the adhesive 381 may be adhered to a second portion 384 of the flexible sheet 351, each of the first and second portions extending along the at least one wire when the flexible sheet is fit over the wire connector first end, the two portions of the flexible sheet being securable about the at least one wire by contacting the adhesive 380 on the first portion 382 with the adhesive 381 on the second portion 384. The restraining device sheet is preferably made from a polymer although are materials will also provide sufficient strength and flexibility. Other materials may include vinyl, polypropylene, nylon, polyester, polyethylene, paper, glass, rubber, porcelain, ceramic, plastic, wood, plastic coated metal or plant materials. The adhesive can be any suitable adhesive including contact adhesive, reactive adhesives, single-component reactive adhesive, two component adhesives, two component reactive adhesives, hot melt adhesive, or pressure sensitive adhesive. As shown in FIG. 27 the adhesive 380 and the adhesive 381 may be adhered to a second portion 384 adhere to the flexible sheet 351 and wires 850 and wire 855.

Figure 24:
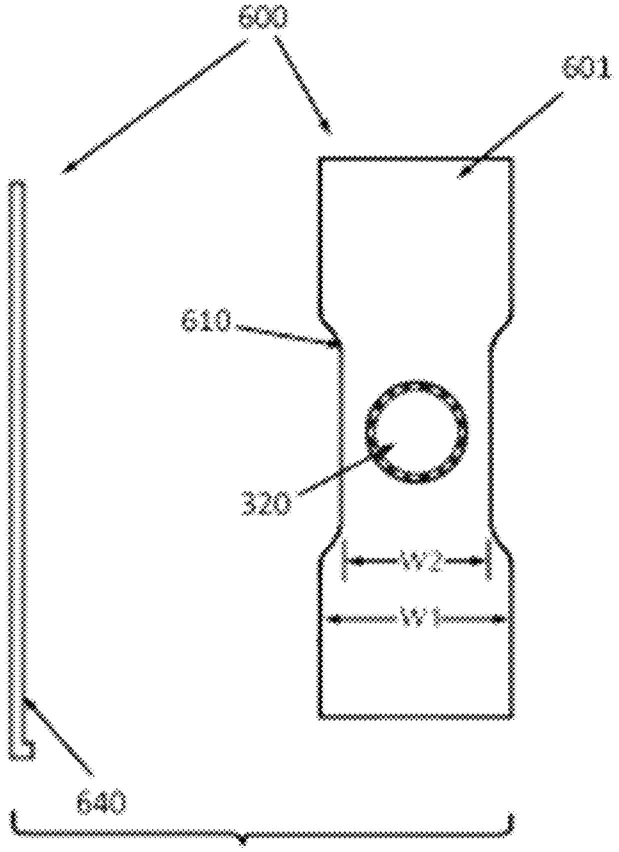
FIG. 24 shows an alternative device of the instant invention with another insulative flexible sheet.

Further the embodiment shown in FIG. 22 is a restraining device of the present invention for securing at least one wire to an electrical connector is shown in FIG. 25. As shown in FIG. 25 The electrical connector 100 includes an insulative housing 101 having a housing outer surface, a first end and a second end opposite the first end. The housing 101 includes a cavity extending inwardly from an opening in said first end of the housing for the terminal end 858, 859 of the one wire or plurality of wires. The restraining device includes a rectangular flexible sheet 351 as shown in FIG. 23 has a sheet length L and a sheet width W, the sheet length L longer than the width W. The rectangular flexible sheet includes a sheet opening 320 disposed within the sheet perimeter 360, 362, 364, 366, the sheet opening engageable with the electrical connector housing outer surface. The flexible sheet 351 includes a reinforcement ring 330 secured along an edge of the sheet opening. The reinforcement ring 330 is optional. The reinforcement ring 330 that prevents the sheet opening from damage during installation or use. The flexible sheet 351 includes an adhesive 380, 381 disposed on the flexible sheet 351 adjacent each of said perimeter widths 360, 364. The restraining device 350 includes a sheet securing device 340 having a device length and is extendable and securable around the at least one wire and a portion of the flexible sheet adjacent a portion of the sheet perimeter when the portion of the flexible sheet is extended from the connector housing, past the connector first end and along the at least one wire. An installer ensures the wire connector is properly placed on the at least one wire, places the reinforcement ring over the second end of the wire connector, pulls the adhesive portions of the flexible sheet over the first end of the wire connector and adjacent the at least one wire, urging the adhesive portions against the at least one wire and against one another, placing the sheet securing device around the at least one wire and flexible sheet and securing the sheet securing device around the at least one wire and flexible sheet to secure the wire connector sheet securing device and the adhesive from coming off the at least one wire. As shown in FIG. 24, the restraining device 600 may include a narrowed flexible sheet width 610 having a width dimension W2 adjacent the sheet opening, the width dimension W2 being less than the end width dimension W1. The narrower width adjacent to the sheet opening allows for wire connector wings 199 which protrude from some housing 101. The narrower width also provides for less excess material sticking out from the connection. The embodiment of FIG. 24 can also incorporate an adhesive 380, 381 as shown in FIG. 23 which is disposed on the flexible sheet 610 adjacent to each of said perimeter widths 360, 364. Alternatively the embodiment can use securing device 340.

As shown in FIG. 23 and FIG. 25 alternatively the device can be used without a securing device 340 and the adhesive 380 and/or adhesive 381 can be used to secure the flexible sheet 301, 610 or 351 to the wires 858 and 859.

As shown in FIG. 25 a restraining device 300 for securing at least one wire to an electrical connector 100. The electrical connector 100 includes an insulative housing 101 having a housing outer surface, a first end and a second end opposite the first end. The housing 101 includes a cavity extending inwardly from an opening in said first end of the housing for the terminal end 858, 859 of the one wire or plurality of wires 858 and 859.

Figure 26:
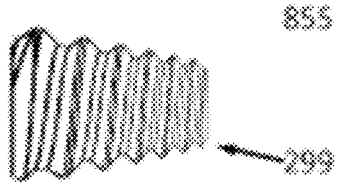
FIG. 26 is a side elevational view of the housing conductive coil shown in the cutaway view of FIG. 25

FIG. 25 shows a cutaway view of the housing with a conductive coil 299. The conductive coil 299, also shown in FIG. 26, is used in a wire connector for increasing integrity of the electrical connection of the wires and for aiding in tightening the twisted connection of the wires. This conductive coil 299 any be used in any embodiment of wire connectors described in the paragraphs above.

The instant invention in additional embodiments able to serve a dual purpose of not only securing connectors with cabling but also as a method of repairing cabling or wiring when it has been cut or damaged.

The instant invention in additional embodiments able to serve a dual purpose of not only securing connectors with cabling but also as a method of providing strain relief such as in automobile headlights, or turn signals, or autonomous vehicles.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A restraining device for securing at least one wire to an electrical connector comprising:

a. said electrical connector including an insulative housing having a housing outer surface, a first end and a second end opposite said first end, said housing having a cavity extending inwardly from an opening in said first end of the housing;

b. said restraining device including an insulative flexible sheet having a sheet perimeter and a sheet opening disposed within said sheet perimeter, said sheet opening engageable with said electrical connector housing outer surface;

c. said restraining device including an adhesive on a first portion and a second portion of the flexible sheet, each of the first and second portions extending along the at least one wire when the flexible sheet is fit over said electrical connector first end, said two portions of the flexible sheet being securable about the at least one wire by contacting the adhesive on said first portion with said adhesive on the second portion; and d. a sheet securing device having a length, said sheet securing device extendable and securable around said at least one wire and a portion of said flexible sheet adjacent a portion of said sheet perimeter when said portion of said flexible sheet is extended from the connector housing, past the connector first end and along said at least one wire;

e. the first end when said flexible sheet said restraining device holds said at least one wire from coming out of said electrical connector cavity.

2. The restraining device of claim 1 wherein said sheet opening includes an opening edge and a reinforcement ring secured along said opening edge, said reinforcement ring for preventing the sheet opening from damage during installation or use.

3. The restraining device of claim 1 including adhesive on at least a portion of the flexible sheet which extends along the at least one wire when the flexible sheet is fit over the restraining device first end.

4. The restraining device of claim 1 wherein the flexible sheet is a sheet strip having strip ends extendable to the at least one wire.

5. The restraining device of claim 4 wherein the strip ends include an adhesive for securing the strip ends to the wire.

* * * * *